June 16, 1964 J. R. HAYNES 3,137,603

APPARATUS AND METHOD FOR SPLICING PERFORATED TAPE

Filed Dec. 21, 1960 2 Sheets-Sheet 1

INVENTOR.
JOHN R. HAYNES

BY James H. Conner

AGENT.

June 16, 1964 J. R. HAYNES 3,137,603

APPARATUS AND METHOD FOR SPLICING PERFORATED TAPE

Filed Dec. 21, 1960

2 Sheets-Sheet 2

INVENTOR.
JOHN R. HAYNES

BY James H. Conner

AGENT.

United States Patent Office 3,137,603

Patented June 16, 1964

3,137,603

APPARATUS AND METHOD FOR SPLICING PERFORATED TAPE

John R. Haynes, Halesite, N.Y., assignor to Haynes Industries, Inc.

Filed Dec. 21, 1960, Ser. No. 77,418
3 Claims. (Cl. 156—157)

This invention relates generally to tape splicing devices and in particular to a novel tape splicing device which may be universally utilized to splice differing multi-channel codally perforated data tapes.

Heretofore, prior tape splicing devices were limited to the splicing of a single predetermined channeled tape, i.e. one device would be required for the five channeled tape while differing devices would be required for six, seven, or even eight channeled tapes.

In certain instances, the data tape may require the deletion of certain parts of the coded information and/or the insertion of additional coded information. Sections of the data tape may be cut away and additional sections of data tape inserted between the cut portions of the tape. Thus, data errors may be eliminated or additive data may be added without necessitating a complete re-perforation of the data tape. The related ends of the separated tapes are abutted one to the other, and a special coated perforated splicing tape thermally affixed thereto adjacent the abutted ends.

It is well known in the tape perforating art that each transverse row of discriminate perforations in a data tape represents a unit of data or information. These units of data are successively perforated in the tape in specfic relation to each other and to a pre-perforated longitudinal row of feed apertures. Data tapes perforated in this manner have been utilized for many years and essentially are a means for storing information. With the advent of the high speed computer, plastic or other material tapes are utilized as a means to rapidly feed information to the computer. The data tapes are codally perforated with accumulated data that is sensed and utilized within the computer. It is readily apparent that the perforating of the tapes with such data is a time consuming and costly process. Accidental tearing of a perforated tape, or an error in the data perforations often necessitated the re-perforating of the entire tape, and tapes utilized in high speed computers may contain many thousand bits of information which frequently cannot be replaced. The present invention eliminates the re-perforating of a data tape in that it permits the accurate repair of a data tape without loss of a single piece or unit of information.

The present invention readily splices edited or torn tapes without materially increasing the thickness of the tape, and permits such spliced tapes to be utilized in tape feeding devices in the same manner as though the tape was continuous and had not been spliced.

One of the principal objects of the invention is to provide a tape splicing device which is compatible with various width multi-channel perforated tapes, and which will effectively splice said multi-channel tapes without the removal or addition of extraneous alignment mechanisms.

Another object of the invention resides in the provision of a novel coated splicing tape for splicing edited or torn codally perforated data tapes on the present device.

Yet another object of the invention is to provide a tape splicing device having accurate standard indexing means to simplify the splicing process while maintaining the required splicing accuracy.

And another object of the invention is to provide a common splicing tape that is adapted to be used for splicing different multi-channeled perforated tapes without alteration.

Other ancillary objects will be, in part, hereinafter pointed out and will be, in part, hereinafter apparent.

Figure 1:
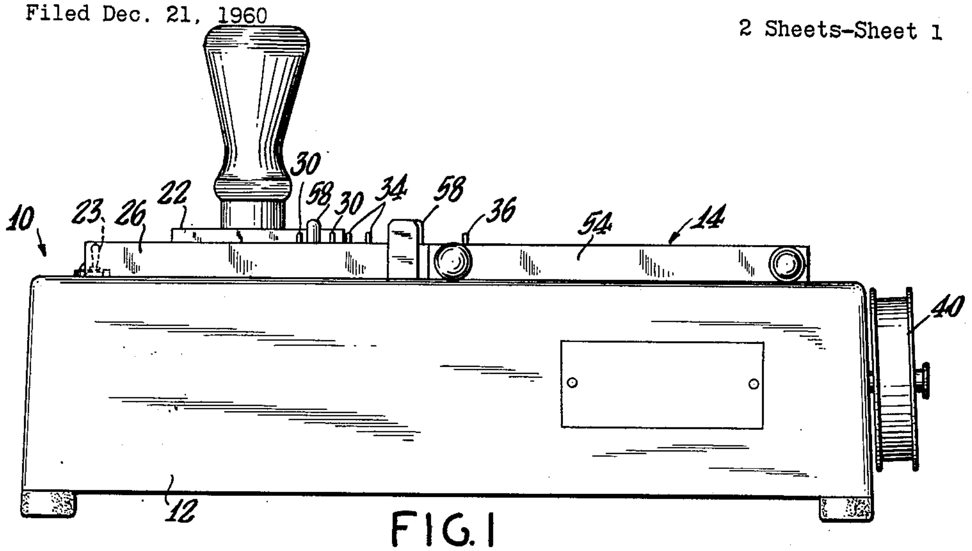
FIGURE 1 is a front elevation of a tape splicing device embodying the invention.
Figure 2:
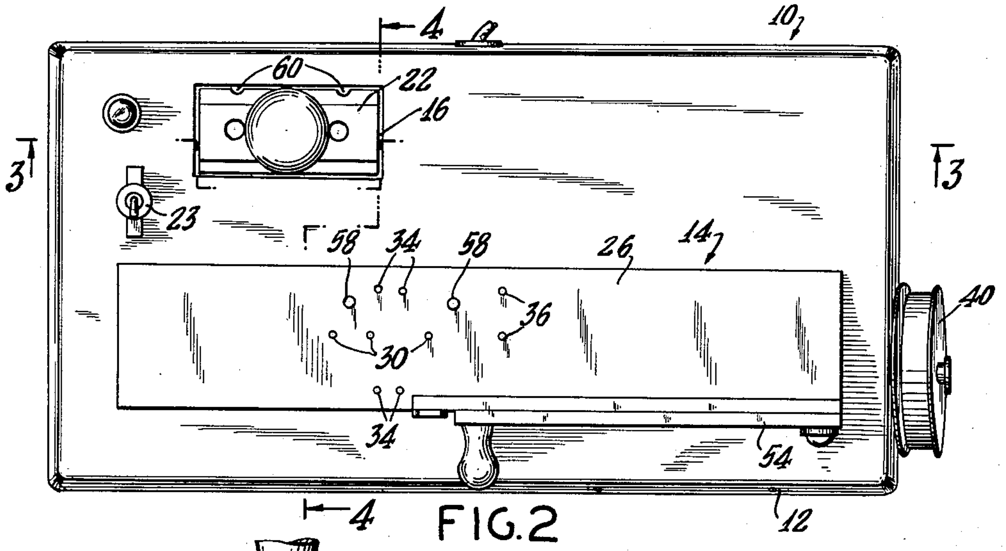
FIGURE 2 is a plan elevation of the splicer.
Figure 3:
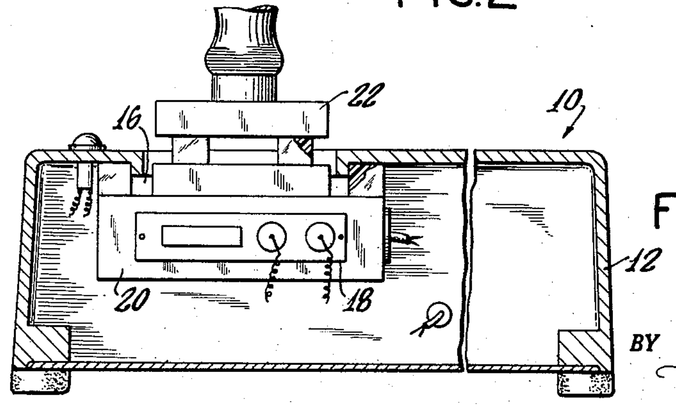
FIGURE 3 is a longitudinal cross-section taken along line 3—3 of FIGURE 2.
Figure 4:
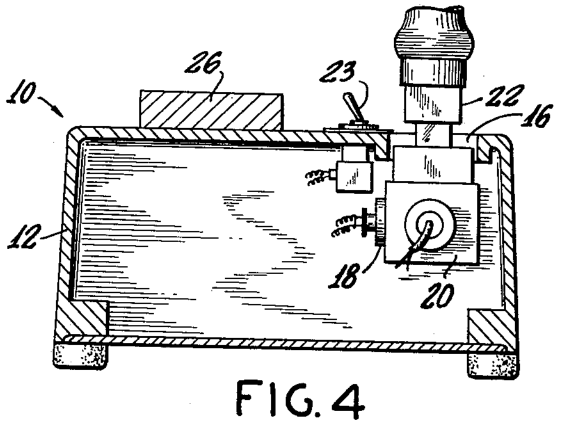
FIGURE 4 is a transverse cross-section taken along line 4—4 of FIGURE 2.
Figure 5:
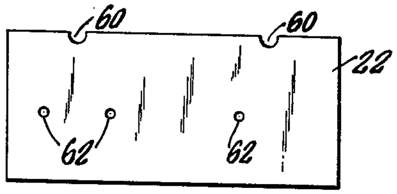
FIGURE 5 is a bottom view of a heating iron.

Referring to the drawings in detail, the numeral 10 generally designates the tape splicing device which comprises a base casting 12 having a planar rectangular splicing table 14 mounted on the top thereof. Base 12 is further provided with a heating well 16 having thermostatically controlled heating elements 18 mounted in a heater block 20 disposed within the well 16. Removable heating iron 22, hereinafter described in detail, is adapted to reside within the well 16 in contact with the contact with the heater block 20 and be heated thereby. Switch 23 is provided to control the circuit to the heater elements 18. This circuit is well known to anyone skilled in the art and therefore is not described in detail herein.

Figure 6:
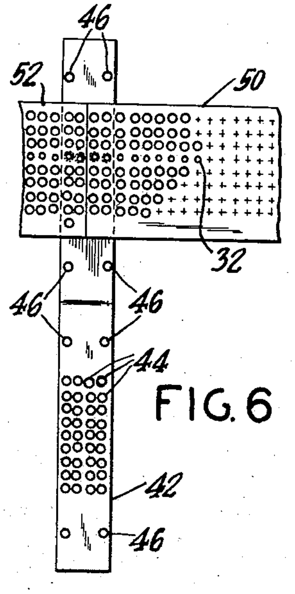
FIGURE 6 is a detail of the data tape and splicing tape illustrating the first phase of a splicing operation.
Figure 7:
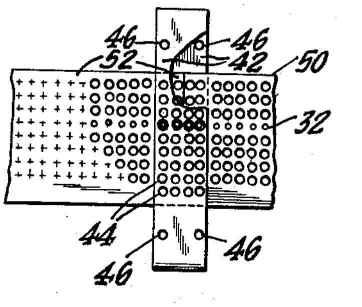
FIGURE 7 is a detail of a completed splice prior to the trimming operation.

The splicing table 14 generally comprises a rectangular plate 26 having a planar top surface from which a series of guide pins 30 vertically project. Guide pins 30 are discriminately spaced one from the other and are adapted to receive thereon the feed or sprocket holes 32 conventionally provided in codally perforated data tapes (FIG. 6). Guide pins 30 are disposed in aligned relation along the long axis of the splicing table 26. Two pairs of splicing tape alignment pins 34 similarly extend in vertical relation from the splicing table 26 and are disposed in indexed relation to the guide pins 30. Alignment pins 34 are further disposed in transverse relation to the longitudinal axis of the splicing table 26 for a purpose hereinafter appearing. In addition, a secondary set of transverse guide pins 36 are provided extending vertically from the splicing table 26. Guide pins 36 are also provided for a purpose hereinafter appearing.

Disposed on one side of the base 10 is a splicing tape dispenser 40 on which a supply of multi-sectioned splicing tape 42 is stored. Tape 42 is precoated with a thermally setting adhesive backing, and may be made of a commercially available polyethylene terephthalate resin sold under the trademark Mylar.

Each section of splicing tape 42 is provided with a plurality of equally spaced aligned perforations 44 therein. As shown, these sections may have a width sufficient to accommodate four rows of perforations and a length including nine columns of perforations. Further, each section of tape 42 is provided with two pairs of apertures 46 spaced from, but in alignment with, respective outer rows of perforations 44. Each pair of perforations 46 is adapted to be manually disposed on a respective pair of splicing tape guide pins 34 on table 26. In operation, a dual section of splicing tape 42 is removed manually from the dispenser 40. The first section of splicing tape 42 is aligned on pin 34 with its adhesive side facing upwardly. The adjacent sections 50, 52 of the codally perforated tape which is being spliced, are disposed in aligned relation via sprocket holes 32 on the tape guide pins 30, with the ends abutting but not overlapping one another. It will be noted that the coded perforations in each section 50, 52 overlie certain of the perforations 44 of the splicing tape 42 in co-aligned relation. The second section of splicing tape 42, as shown in FIG. 6, having identical plural perforations 44 therein is folded over on top of data tape sections 50, 52 and manually pressed down on the guide pins 34 with the adhesive side down. In this case also, the perforations 44 lie in co-aligning relation with the coded perforations in the sections 50, 52. Since both sections of splicing tape 42 have a perforation corresponding to every data position of the main tape, the information stored therein is unaltered.

The heating iron 22 is then disposed on the splicing tape 42 and gently pressed downwardly on the table 26. The application of heat to the splicing tape 42 thermally sets the adhesive coating thereon in binding relationship with the paper or plastic perforated tape sections 50, 52. The spliced data tape is then removed, inverted, and replaced on the guide pins 30. Once again the heating iron 22 is applied to the splicing tape and a duplicate binding process occurs. The combined data tape and splice is then removed from the guide pins 30 and 34 and placed in longitudinal aligned relation with the pivotable trimming knife 54 which is actuated so that the residue of the splicing tape 42 extending beyond the margins of the data tape is removed. Obviously, one side of the excess splicing tape 42 is trimmed and then the other excess portion of the tape 42 is successively trimmed. Guide pins 36 may be utilized to align a transverse portion of the data tape with the knife 54 so that abutting ends of separate data tape sections are parallel.

It will be noted that a pair of spaced dowels 58 project vertically from the table 26. Dowels 58 co-act with a pair of equally spaced recesses 60 in the heating iron 22 to facilitate the proper alignment of apertures 62 therein with the guide pins 30 when the iron 22 is disposed on the splicing tape 42.

In the event that a single section of splicing tape 42 is utilized, the operation heretofore described relating to the underneath position of tape 42 is omitted. Obviously, when splicing torn tapes, the two torn ends are disposed under the tape 42.

The transverse relationship of the splicing tape to the codally perforated paper tape permits the universal utilization of a standard splicing tape 42. The pins 34 on table 26 are indexed and positioned in accurate predetermined spaced relation from the guide pins 30 and as such perform as a standard substantially common to all multichanneled data tapes. The indexed spacing is equal to the substantially common distance between the ever present feed holes in a data tape and one marginal edge thereof. This common distance has been adopted and used in the past and at present by data tape manufacturers. In effect, one transverse row of perforations 44 is adapted to overlie and align with the feed hole perforations 32 provided in all multi-channel data tapes. The balance of the oppositely disposed eight remaining rows of perforations in splicing tape 42 overlie the codal perforations in the data tape, i.e. if an eight channel data tape is being spliced, the four rows of perforations 44 above the feed perforations and the four rows of perforations 44 below the feed perforations will overlie any existing codal perforations in the perforated data tape. In the event a five channel data tape is being spliced, the first two transverse rows of perforations 44 above the center row will overlie the codal area in the upper section of the data tape and the first three rows of perforations 44 below the center row will overlie the codal perforation area on the lower half of the five channel tape. The excess rows of perforations 44 that extend beyond the margins of the data tape, after completion of a splice, may be trimmed off by the use of the trimming knife 54.

While there has been shown but a single embodiment of the invention, it is to be understood that many modifications and changes may be made without departing from the scope thereof, except as limited by the following claims.

The invention claimed is:

1. A method of splicing perforated data tapes, comprising the steps of securing an elongated strip of perforated splicing tape on a splicing table in predetermined registry with the table, securing the ends of the tapes to be spliced in an abutting relationship transversely across said splicing tape in predetermined registry with the table and with the strip of splicing tape thereon, folding said splicing tape over itself so as to envelope the abutting data tape ends with both ends of the folded splicing tape extending beyond both edges of said data tape, securing the folded over top portion of the splicing tape in predetermined registry with the table and with the perforations in the tapes, thermally bonding the splicing tape to both sides of said data tape, and thereafter shearing off both ends of the splicing tape extending beyond the edges of said data tape flush therewith.

2. Apparatus for splicing perforated data tapes, comprising a splicing table having a width greater than the width of any data tape to be spliced thereon, a plurality of longitudinally disposed data tape locating pins extending vertically from said table for holding the ends of the tape to be spliced in an abutting relationship, first and second pairs of splicing tape locating pins arrayed transversely across the abutting data tape ends, the distance between said pairs of splicing tape locating pins being greater than the width of any data tape to be spliced, at least two positioning pins extending vertically from said table in the vicinity of a pair of said splicing tape locating pins, said positioning pins having a height greater than the height of any of said locating pins, a removable heating iron for thermally securing said splicing and data tapes, said heating iron including receiving apertures cooperating with the data tape locating pins, and at least two peripheral edge notches adapted to cooperate with said positioning pins for accurately pre-aligning said heating iron with said data tape locating pins prior to transfer thereof into contact with the data and splicing tapes, and means situated within said apparatus for receiving and heating said heating iron.

3. Apparatus for splicing perforated data tapes, comprising a splicing table having a width greater than the width of any data tape to be spliced thereon, a plurality of longitudinally disposed data tape locating pins extending vertically from said table for holding the ends of the tape to be spliced in an abutting relationship, first and second splicing tape locating pins arrayed transversely across the abutting data tape ends, the distance between said splicing tape locating pins being greater than the width of any data tape to be spliced, at least two positioning pins extending vertically from said table in the vicinity of one of said splicing tape locating pins, said positioning pins having a height greater than the height of any of said data tape locating pins, a removable heating iron for thermally securing said splicing and data tapes, said heating iron including receiving apertures cooperating with the data tape locating pins, and at least two peripheral edge notches adapted to cooperate with said positioning pins for accurately pre-aligning said heating iron with said data tape locating pins prior to transfer thereof into contact with the data and splicing tapes.

References Cited in the file of this patent

UNITED STATES PATENTS

| | | |
|---|---|---|
| 2,506,933 | Mercer | May 9, 1950 |
| 2,539,611 | Daniel et al. | Jan. 30, 1951 |
| 2,565,009 | Wallingsford | Aug. 21, 1951 |
| 2,672,180 | Nichols et al. | Mar. 16, 1954 |
| 2,740,461 | Siebein | Apr. 3, 1956 |
| 2,940,884 | White | June 14, 1960 |
| 2,969,106 | Reibel et al. | Jan. 24, 1961 |
| 2,994,362 | Hall | Aug. 1, 1961 |
| 3,075,572 | Catozzo | Jan. 29, 1963 |